(12) United States Patent
Moss

(10) Patent No.: US 7,964,105 B2
(45) Date of Patent: Jun. 21, 2011

(54) METHOD FOR IMPROVING BELT PRESS DEWATERING

(76) Inventor: William Harris Moss, Coral Springs, FL (US)

(*) Notice: Subject to any disclaimer, the term of this patent is extended or adjusted under 35 U.S.C. 154(b) by 0 days.

(21) Appl. No.: 12/221,699

(22) Filed: Aug. 7, 2008

(65) Prior Publication Data
US 2010/0032384 A1    Feb. 11, 2010

(51) Int. Cl.
*B01D 37/00* (2006.01)
*B30B 9/24* (2006.01)

(52) U.S. Cl. ........ 210/770; 210/783; 210/791; 210/248; 210/386; 210/391; 210/396; 210/400; 210/401; 210/408; 34/381; 34/413; 34/497; 100/37; 100/118

(58) Field of Classification Search .................. None
See application file for complete search history.

(56) References Cited

U.S. PATENT DOCUMENTS

| | | | |
|---|---|---|---|
| 705,071 A * | 7/1902 | Graham | 100/154 |
| 1,775,830 A * | 9/1930 | Reynolds | 100/37 |
| 1,869,987 A * | 8/1932 | Van Denburg | 100/153 |
| 2,052,909 A * | 9/1936 | Van Roggen et al. | 100/37 |
| 2,111,720 A * | 3/1938 | Padgett | 100/37 |
| 2,209,756 A * | 7/1940 | Berry | 162/205 |
| 2,365,658 A * | 12/1944 | Schumacher | 100/121 |
| 2,734,377 A * | 2/1956 | Traver | 73/61.71 |
| 2,987,988 A * | 6/1961 | Robledano | 100/118 |
| 3,038,789 A * | 6/1962 | Bennett et al. | 422/251 |
| 3,093,064 A * | 6/1963 | Burner et al. | 100/37 |
| 3,110,244 A * | 11/1963 | Goodale | 100/120 |
| 3,254,768 A * | 6/1966 | Shimizu | 210/193 |
| 3,315,370 A * | 4/1967 | Hikosaka | 34/70 |
| 3,330,206 A * | 7/1967 | Bechard | 100/153 |
| 3,446,139 A * | 5/1969 | Coffelt | 100/118 |
| 3,459,122 A * | 8/1969 | Saller et al. | 100/118 |
| 3,459,123 A * | 8/1969 | Begiebing | 100/118 |
| 3,552,304 A * | 1/1971 | French et al. | 100/37 |
| 3,601,039 A * | 8/1971 | Schover | 100/118 |
| 3,613,564 A * | 10/1971 | Adamski et al. | 100/118 |
| 3,685,436 A * | 8/1972 | Mitchell, Jr. | 100/37 |
| 3,699,881 A * | 10/1972 | Levin et al. | 100/118 |
| 3,770,581 A * | 11/1973 | Orbison et al. | 162/348 |
| 3,774,760 A * | 11/1973 | Beristain et al. | 210/770 |
| 3,775,242 A * | 11/1973 | Orbison et al. | 162/208 |
| 3,783,666 A * | 1/1974 | Rosansky et al. | 72/199 |
| 3,792,656 A * | 2/1974 | Heissenberger | 100/118 |
| 3,796,148 A * | 3/1974 | Heissenberger | 100/118 |
| 3,796,149 A * | 3/1974 | Heissenberger | 100/118 |
| 3,800,952 A * | 4/1974 | Bastgen | 210/324 |
| 3,801,250 A * | 4/1974 | Kaiser et al. | 425/224 |
| 3,823,062 A * | 7/1974 | Ward et al. | 162/123 |
| 3,894,486 A | 7/1975 | Sparowitz | |

(Continued)

FOREIGN PATENT DOCUMENTS
DE         3526941 A1 *  2/1987
(Continued)

*Primary Examiner* — Robert James Popovics

(57) ABSTRACT

A method for increasing the removal of a higher fraction of liquid from the press cake in any belt press is described. Specifically, the invention incorporates a series of rollers that create multiple pinch points to compress the solid fraction while removing liquid. After each pinch point, the solid material is allowed to separate from the belt, fall by gravity, and repack so that more liquid can be released at each successive pinch point than is possible if the material is fed to multiple rollers and pinch points in series without decompressing as is done is prior art.

4 Claims, 4 Drawing Sheets

U.S. PATENT DOCUMENTS

| | | | | |
|---|---|---|---|---|
| 3,896,030 A * | 7/1975 | Bahr | | 210/384 |
| 3,906,853 A * | 9/1975 | Wohlfarter | | 100/118 |
| 3,915,865 A * | 10/1975 | Haji et al. | | 210/329 |
| 3,942,433 A | 3/1976 | Wohlfarter | | |
| 3,945,789 A * | 3/1976 | Boman | | 425/371 |
| 3,951,805 A * | 4/1976 | Dodd | | 210/193 |
| 3,951,809 A * | 4/1976 | Kollmar | | 210/241 |
| 3,973,484 A * | 8/1976 | Jarrett et al. | | 100/153 |
| 3,979,296 A * | 9/1976 | Bastgen | | 210/324 |
| 3,994,774 A * | 11/1976 | Halme et al. | | 162/273 |
| 4,019,431 A * | 4/1977 | Bastgen | | 100/37 |
| 4,053,419 A | 10/1977 | Pav | | |
| 4,066,548 A * | 1/1978 | Olson et al. | | 210/160 |
| 4,105,558 A * | 8/1978 | Heinrich et al. | | 210/199 |
| 4,142,461 A * | 3/1979 | Bastgen | | 100/118 |
| 4,142,971 A * | 3/1979 | Le Fur et al. | | 210/770 |
| 4,144,807 A * | 3/1979 | Bastgen | | 100/118 |
| 4,147,101 A | 4/1979 | Heissenberger et al. | | |
| 4,158,627 A * | 6/1979 | Ingemarsson | | 210/771 |
| 4,159,947 A * | 7/1979 | Brooks et al. | | 210/108 |
| 4,166,688 A * | 9/1979 | Sachs | | 396/617 |
| 4,172,416 A * | 10/1979 | Hakansson | | 100/118 |
| 4,173,249 A * | 11/1979 | Holkko et al. | | 162/358.3 |
| 4,181,616 A | 1/1980 | Bahr | | |
| 4,203,845 A * | 5/1980 | Brouwer | | 210/386 |
| 4,260,492 A * | 4/1981 | Ito et al. | | 210/386 |
| 4,266,474 A * | 5/1981 | Bahr | | 100/118 |
| 4,303,523 A * | 12/1981 | Ruppnig | | 210/386 |
| 4,348,290 A * | 9/1982 | Schipper | | 210/783 |
| 4,358,381 A * | 11/1982 | Takeuchi et al. | | 210/727 |
| 4,392,422 A * | 7/1983 | Hakansson | | 100/118 |
| 4,417,982 A * | 11/1983 | Britschgi et al. | | 210/386 |
| 4,425,842 A * | 1/1984 | Winch et al. | | 100/37 |
| 4,427,157 A * | 1/1984 | Klein | | 241/15 |
| 4,434,633 A * | 3/1984 | Winch et al. | | 68/267 |
| 4,447,334 A * | 5/1984 | Britschgi et al. | | 210/783 |
| 4,475,453 A * | 10/1984 | Davis | | 100/118 |
| 4,491,521 A * | 1/1985 | Wenske et al. | | 210/401 |
| 4,492,155 A * | 1/1985 | Wolkenstein | | 100/118 |
| 4,543,880 A * | 10/1985 | Svensson | | 100/37 |
| 4,557,833 A * | 12/1985 | Krenmayr et al. | | 210/386 |
| 4,584,936 A * | 4/1986 | Crandall et al. | | 100/118 |
| 4,595,499 A * | 6/1986 | Kormanik et al. | | 210/202 |
| 4,613,293 A * | 9/1986 | Gerhardt | | 425/371 |
| 4,621,999 A * | 11/1986 | Gerhardt | | 425/371 |
| 4,622,894 A * | 11/1986 | Crandall et al. | | 100/118 |
| 4,643,088 A * | 2/1987 | Kollmar | | 100/37 |
| 4,643,826 A * | 2/1987 | Prunier | | 210/225 |
| 4,675,079 A * | 6/1987 | Webster | | 162/360.3 |
| 4,681,033 A | 7/1987 | Crandall et al. | | |
| 4,775,472 A * | 10/1988 | Lucis | | 210/386 |
| 4,836,100 A | 6/1989 | Johnson et al. | | |
| 4,861,430 A * | 8/1989 | Andersson | | 162/205 |
| 4,879,034 A | 11/1989 | Bastgen | | |
| 4,888,966 A * | 12/1989 | Zapfel et al. | | 69/41 |
| 4,961,862 A | 10/1990 | Janecek | | |
| 4,986,910 A | 1/1991 | Uyama et al. | | |
| 5,022,989 A | 6/1991 | Put | | |
| 5,066,399 A | 11/1991 | Sugihara et al. | | |
| 5,082,562 A * | 1/1992 | Burger | | 210/401 |
| 5,109,764 A | 5/1992 | Kappel et al. | | |
| 5,128,030 A * | 7/1992 | Hautala | | 210/108 |
| 5,133,872 A * | 7/1992 | Baldwin et al. | | 210/709 |
| 5,207,907 A * | 5/1993 | DeLons et al. | | 210/396 |
| 5,240,609 A | 8/1993 | Langley | | |
| 5,433,851 A * | 7/1995 | Itoh | | 210/386 |
| 5,456,832 A * | 10/1995 | Louden et al. | | 210/386 |
| 5,520,530 A * | 5/1996 | Siempelkamp | | 425/371 |
| 5,543,044 A * | 8/1996 | Louden et al. | | 210/386 |
| 5,545,333 A | 8/1996 | Louden et al. | | |
| 5,572,801 A * | 11/1996 | Ahokas et al. | | 34/117 |
| 5,592,874 A | 1/1997 | Blauhut | | |
| 5,879,551 A * | 3/1999 | Kolmar et al. | | 210/401 |
| 6,221,265 B1 * | 4/2001 | Hoden | | 210/770 |
| 6,241,900 B1 * | 6/2001 | Nakamura et al. | | 210/769 |
| 6,248,245 B1 * | 6/2001 | Thompson | | 210/783 |
| 6,273,270 B1 * | 8/2001 | Nakamura et al. | | 210/386 |
| 6,325,895 B1 * | 12/2001 | Graf | | 162/205 |
| 6,338,773 B1 * | 1/2002 | Sbaschnigg et al. | | 162/300 |
| 6,454,102 B2 | 9/2002 | Thompson | | |
| 6,589,394 B2 * | 7/2003 | Beck | | 162/360.3 |
| 6,616,812 B2 * | 9/2003 | Beck | | 162/358.2 |
| 6,702,924 B2 * | 3/2004 | Beck | | 162/205 |
| 7,051,882 B2 * | 5/2006 | Odmark et al. | | 210/401 |
| 7,314,141 B1 * | 1/2008 | Day | | 210/400 |
| 7,323,087 B2 * | 1/2008 | Beck | | 162/205 |
| 7,381,329 B1 | 6/2008 | Moss | | |
| 7,651,619 B2 * | 1/2010 | Hansen et al. | | 210/695 |
| 7,841,103 B2 * | 11/2010 | Hada et al. | | 34/119 |
| 7,882,960 B2 * | 2/2011 | Hansen et al. | | 210/386 |
| 2008/0035560 A1 * | 2/2008 | Hansen et al. | | 210/524 |
| 2008/0110838 A1 * | 5/2008 | Moss | | 210/783 |
| 2010/0032384 A1 * | 2/2010 | Moss | | 210/770 |

FOREIGN PATENT DOCUMENTS

| | | | | |
|---|---|---|---|---|
| GB | 2010690 A | * | 7/1979 | |
| JP | 58029597 A | * | 2/1983 | |
| JP | 59113999 A | * | 6/1984 | |
| JP | 59133996 A | * | 8/1984 | |
| JP | 60049893 A | * | 3/1985 | |
| JP | 60049896 A | * | 3/1985 | |
| JP | 60137600 A | * | 7/1985 | |
| JP | 60184495 A | * | 9/1985 | |
| JP | 60210399 A | * | 10/1985 | |

* cited by examiner

METHOD FOR IMPROVING BELT PRESS DEWATERING

FIELD OF THE INVENTION

The present invention relates to the field of solids/liquid separation. More particularly, the invention relates to a method for increasing the removal of liquid from the press cake in any belt press.

BACKGROUND OF THE INVENTION

Various methods are known for removing liquid from mixtures of solids and liquid. In cases where solids consist primarily of compressible granular, fibrous or cellular material and the liquid is water, equipment selected for these applications have included belt presses, centrifuges, screw presses and vacuum filters.

There are technical and economic reasons for selecting a particular technology. Technical reasons for selecting a belt press include the ability to operate continuously; the ability to produce a dry press cake with a target specification for % solids (or % moisture equal to 100%-% solids); and the ability to retain a high proportion of the incoming solids in the press cake.

Numerous examples of belt presses are provided in the prior art—for example, U.S. Pat. Nos. 7,381,329 (Moss), 6,454,102 (Thompson), 5,592,874 (Blauhut), 5,545,333 (Louden et al.) and 4,681,033 (Crandall et al.). In general, a belt press has a frame with an upper belt and a lower belt. Both upper and lower belts are typically liquid permeable [see U.S. Pat. Nos. 6,454,102 (Thompson), 5,592,874 (Blauhut), 5,545,333 (Louden et al.), 5,109,764 (Kappel et al.), 4,986,910 (Uyama et al.), 4,961,862 (Janecek), 4,879,034 (Bastgen), 4,836,100 (Johnson et al.), 4,681,033 (Crandall et al.), 4,181,616 (Bahr), 4,147,101 (Heissenberger et al.), and 3,942,433 (Wohlfarter)], although U.S. Pat. No. 5,022,989 (Put) suggests a non-permeable upper belt combined with a permeable lower belt is more advantageous. U.S. Pat. No. 4,986,910 (Uyama et al.) discusses the limitation of twin permeable filter fabrics for dewatering sludges.

Belt presses can employ several stages at which different techniques are used to remove the liquid from a mixture of solids and liquid. The use of these different stages improves filtering efficiency throughout the belt filter press.

In a typical belt press with multiple stages, the mixture initially enters a gravity screening zone of the belt press where free water drains through the lower permeable belt by gravity. The gravity screening zone is used primarily to remove free water. At the end of the gravity screening zone, the mixture could be near 10% solids. U.S. Pat. Nos. 6,454,102 (Thompson), 5,545,333 (Louden et. al.), 5,240,609 (Langley), 5,066,399 (Sugihara et al.), 5,022,989 (Put), 4,986,910 (Uyama et al.), 4,961,862 (Janecek), 4,836,100 (Johnson et al.) and 4,181,616 (Bahr) describe belt presses with gravity screening zones.

After the gravity screening zone, the mixture of solids and liquids enters the wedge zone where the upper belt and the lower belt carrying the mixture of solids and liquid converge with one another, applying progressively increasing pressure as the mixture is compressed between the belts. The degree to which the mixture is compressed corresponds to the angle of convergence of the belts, also called the wedge angle. The wedge angle may be fixed at all times or mechanically adjusted prior to running the filter press to accommodate a particular mixture. Wedge zones are shown in U.S. Pat. Nos. 7,381,329 (Moss), 6,454,102 (Thompson), 5,545,333 (Louden et al.), 5,240,609 (Langley), 5,109,764 (Kappel et. al), 5,066,399 (Sugihara et al.), 5,022,989 (Put), 4,986,910 (Uyama et al.), 4,961,862 (Janecek), 4,879,034 (Bastgen), 4,836,100 (Johnson et al.), 4,681,033 (Crandall et al.), 4,181,616 (Bahr), 4,053,419 (Pav), 3,942,433 (Wohlfarter), 3,894,486 (Sparowitz et al.) and 3,796,149 (Heissenberger).

Some belt presses have a higher pressure zone wherein the upper and lower belt follow a path between progressively smaller press rolls which may be either perforated or solid drums. The pressure imparted to the material between the upper and lower belts in the high pressure stage increases greatly from the largest perforated drum or solid roller to the smallest perforated drum or roller. High pressure zones are shown in U.S. Pat. Nos. 5,545,333 (Louden), 5,240,609 (Langley), 5,066,399 (Sugihara et. al), 4,986,910 (Uyama et al.), 4,879,034 (Bastgen), 4,836,100 (Johnson et al.), 4,681,033 (Crandall et al.), 4,181,616 (Bahr), 3,942,433 (Wohlfarter), and 3,796,149 (Heissenberger). Except for Uyama et al., each of these inventors teach us that gradually increasing compression pressure through the use of press rollers arranged in decreasing diameters in the direction of movement of the solids/liquid mixture corresponds to a progressive degree of liquid removal. Likewise, increasing shearing force through multiple changes in the direction of movement of the solids/liquid mixture by Z-shaped or S-shaped pathways also corresponds to a progressive degree of liquid removal.

The problem with all prior art is if the porous belt filter fabric becomes clogged or blinded, then liquid can not be separated from the solids/liquid mixture. In U.S. Pat. No. 4,986,910 (Uyama et al.), the inventors teach us that liquid in the solids/liquid mixture is removed only in the vertical direction through the filter fabric(s). To overcome the problem with blinding or clogging, the inventors formed pellets from pre-dehydrated sludge as an intermediate step prior to high compression pressing. The gaps between pellets that were then passed through the high compression zone provided a pathway for liquid to escape to the filter cloth and exit the solid/liquid mixture. The inventors claimed a higher removal rate of liquid in the high compression zone when forming pellets prior to high compression pressing Another problem with the prior art practitioners whom rely on multiple press rollers of decreasing diameter and multiple changes of direction is described in U.S. Pat. No. 4,879,034 (Bastgen) who argues that pressure plates are superior to multiple press rollers because multiple press rollers have sections of reduced pressure between pinch points of multiple press rolls. Liquid that is pressed out in high compression zones at the pinch points will be sucked back into the solid/liquid mixture in low compression zones between the pinch points.

Therefore, the object of this invention is to provide a method for improving all belt press designs by either adding or enhancing the high compression zone using a superior method, the net result being to produce press cakes with higher solids content and less liquid.

SUMMARY OF THE INVENTION

The present invention relates to a belt press high compression zone following a gravity screening zone and a wedge zone. The present invention is either added to a belt press with a gravity screening zone and wedge zone, or the present invention is used to replace a high compression zone that is based on prior art. In a belt press, a solid/liquid mixture is sandwiched between two belts, at least one of which is permeable, to allow liquid to be separated from the solid/liquid mixture. In the gravity screening zone, liquid is allowed to drain through the lower permeable belt without pressure being applied by the upper belt. The wedge zone follows the gravity screening zone wherein the spacing between the two belts becomes increasingly narrow, causing pressure applied by the upper belt to increase as the spacing between the belts decreases. In the high compression zone, the present invention uses a series of multiple rollers attached to a frame that creates a wavelike or S-shaped path for the material.

In a further preferred embodiment, the high compression zone consists of a single, permeable belt. Instead of an upper belt, there are a series of two or more upper rollers that create pinch points with the lower belt and lower-belt pinch point rollers. The upper rollers are mounted close to the lower-belt pinch point rollers to create the pinch point. Any press cake material that adheres to the upper roller is scraped off by individual upper roller scrapers that are positioned on the back side of the upper roller.

In a further preferred embodiment, the center of the lower roller in the wavelike or S-shaped path for the lower belt, also referred to as the companion backward return roller, is positioned so that the press cake is scraped off the lower belt; allowed to separate from the belt; and fall by gravity back onto the lower belt prior to the next pinch point, said separation and fall by gravity allowing the material to re-arrange and repack prior to passing through the next pinch point. The re-arranging and repacking of the press cake material solves the problem with prior art that occurs when the porous belt filter cloth fabric becomes clogged or blinded. Re-arranging and repacking of the press cake provides a path for liquid to reach the surface of the porous filter cloth fabric; pass through filter cloth fabric; and separate without being sucked back into the press cake.

The magnitude of the angle between a vertical line passing through the center of the lower-belt pinch point roller and the center of the companion backward return roller is typically 15° to 75°. The direction of said angle is clockwise beginning at the vertical centerline of the lower-belt pinch point roller and ending at the center of the companion backward return roller.

In a further preferred embodiment, brushes wipe the underside surface of the lower belt after the backward return roller and before material scraped off the lower belt falls by gravity onto said lower belt; wherein said brushes break the surface tension between liquid and the belt allowing liquid to separate from the fabric, providing for a drier fabric to adsorb additional liquid from the press cake material that falls by gravity back onto the belt.

In a further preferred embodiment, the gap width at each pinch point between an upper roller and its lower-belt pinch point roller pair is adjusted by a mechanical separator device such as a screw type separator at the axial bearing rod of each upper roller and its respective lower-belt roller, making it possible to independently increase or decrease the gap width at each pinch point.

In a further preferred embodiment, each of the pinch point gap width separators may incorporate a spring compression or hydraulic cylinder compression assembly so that an increase in the flow of press cake through the gap will increase the compression pressure in the pinch point.

In a further preferred embodiment, the high compression zone of this invention, consisting of:
 a) a series of multiple rollers attached to a frame that creates a wavelike or S-shaped path for the press cake;
 b) a single permeable lower belt;
 c) a series of two or more upper rollers that create pinch points with the lower belt;
 d) lower-belt pinch point rollers; and
 e) companion backward return rollers that are positioned so that the press cake is scraped off the lower belt; allowed to separate from the belt; said separation and fall by gravity allowing the material to re-arrange and re-pack prior to passing through the next pinch point can be added as an independent enhancement to an existing belt press based on prior art. The independent high compression zone may have a lower permeable belt that is different in material, fabric weave pattern, warp and weft thread diameters, opening size, and/or percent of open area than the lower permeable belt in the gravity screening zone and wedge zone.

DESCRIPTION OF THE PREFERRED EMBODIMENTS

Figure 1:
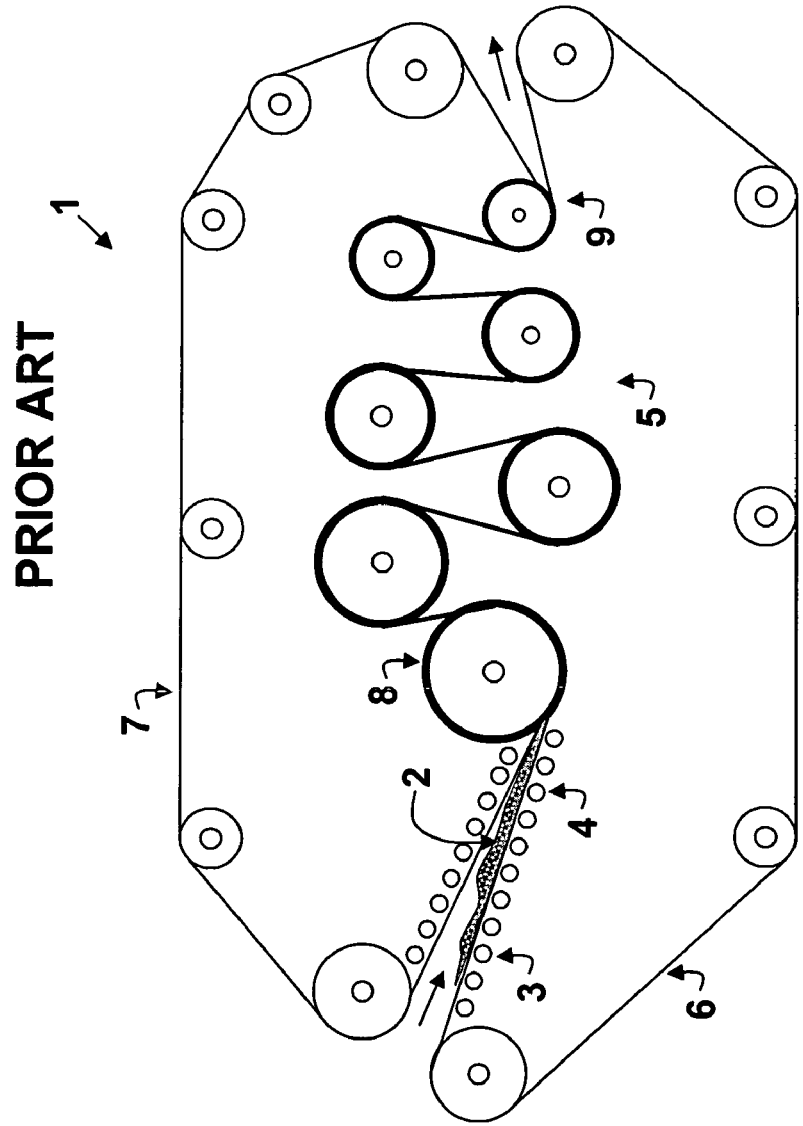
FIG. 1 is a cross-sectional view of a composite of prior art.

The subject of the invention is a method for the removal of a higher fraction of liquid from the press cake produced by a belt press (10) in a high compression zone. The method for removing liquid from press cake in the high compression zone is different from prior art. Referring to FIG. 1, a belt press (1) which is typical of prior art that is used for the separation of a mixture of solids and liquids (2) consists of a gravity screening zone (3), a wedge zone (4), and a high compression zone (5). In the gravity screening zone, liquid is allowed to drain through the lower permeable belt (6) without pressure being applied by the upper belt. The wedge zone follows the gravity screening zone wherein the spacing between the lower permeable belt and the upper belt (7) becomes increasingly narrow, causing pressure applied by the upper belt to increase as the spacing between the belts decreases. The high compression zone consists of a series of press rolls with the solid/liquid mixture sandwiched between the upper and lower belt, wherein the upper and lower belt follow a path between progressively smaller press rolls which may be either perforated drums or solid press rolls. The pressure imparted to the material between the upper and lower belts in the high compression zone increases greatly from the largest perforated drum or solid press roll (8) to the smallest perforated drum or solid press roll (9).

Figure 2:
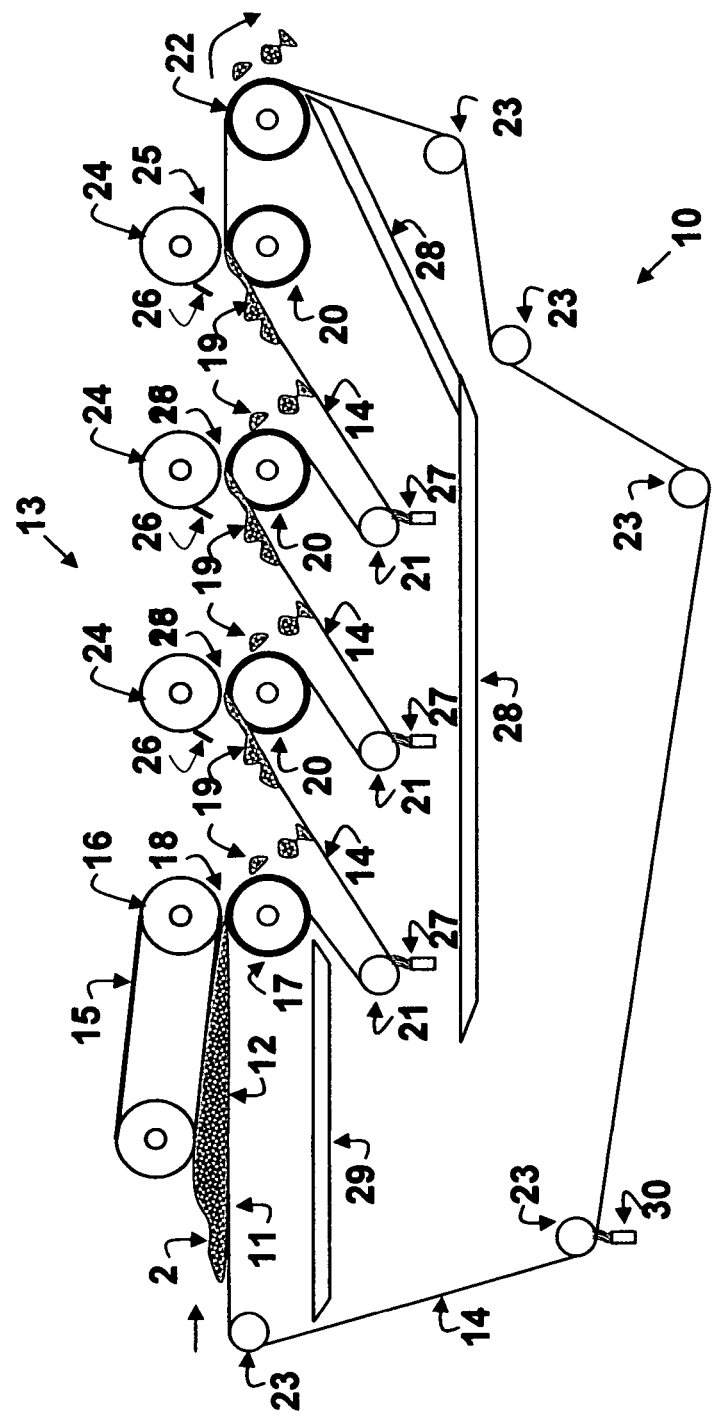
FIG. 2 is a cross-sectional view of the invention.

The method for increasing the removal of liquid from the press cake in the high compression zone which is the subject of this invention is depicted in FIG. 2. The belt press (10) that is used for the separation of a mixture of solids and liquids (2) consists of a gravity screening zone (11), a wedge zone (12), and a high compression zone (13). In the gravity screening zone, liquid is allowed to drain through the lower permeable belt (14) without pressure being applied by the upper belt. The wedge zone follows the gravity screening zone wherein the spacing between the lower permeable belt and the upper belt (15) becomes increasingly narrow, causing pressure applied by the upper belt to increase as the spacing between the belts decreases. At the end of the wedge zone, the upper belt roller (16) and the lower belt roller (17) form a pinch point (18) where the compression pressure is highest prior to the discharge of press cake (19) from the wedge zone.

In the high compression zone, the lower belt is formed into a wavelike or S-shaped path by a series of two or more lower-belt pinch point press rolls (20) and companion backward return rollers (21) that shape the wavelike or S-shaped path. After the series of two or more multiple pinch point press rolls, the lower belt path is formed by a discharge roller (22) and multiple lower belt pick-up rolls (23) which maintain tension on the lower belt and form the pathway for a continuous lower belt.

The high compression zone consists of a single, permeable lower belt. Instead of an upper belt, there are a series of two or more upper rollers (24) that create pinch points (25) with the lower belt and lower-belt pinch point rollers (20). The upper rollers are mounted close to the lower-belt pinch point rollers to create the pinch point. Any press cake material that adheres to the upper roller is scraped off by individual upper roller scrapers (26) that are positioned on the back side of the upper roller.

Figure 3A:
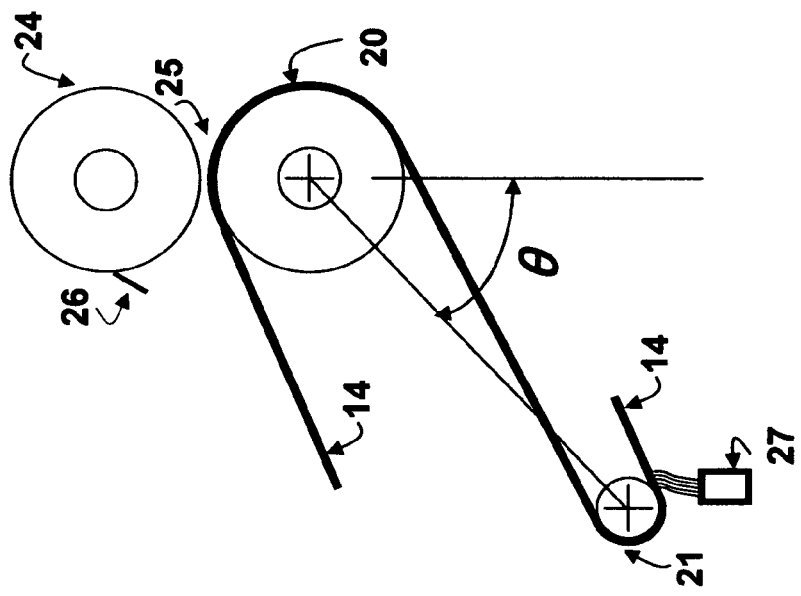
FIG. 3A and FIG. 3B are details showing the arrangement of the lower-belt pinch point roller with respect to the companion backward return roller and the location of the brushes.
Figure 3B:
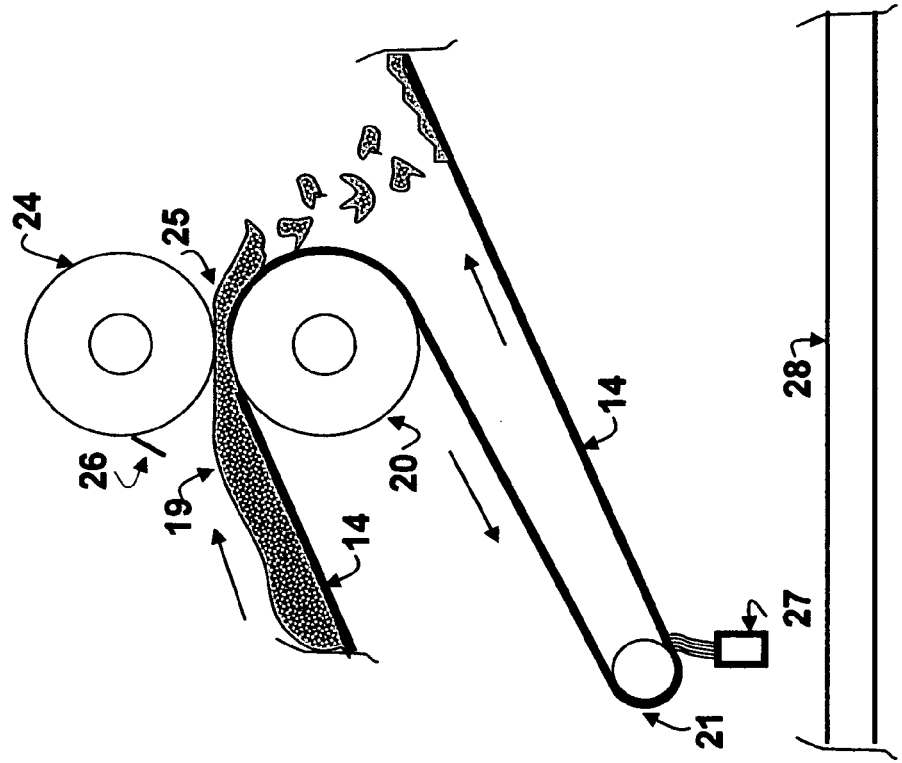

Referring to FIG. 3A, the center of each backward return roller (21) in the wavelike or S-shaped path for the lower belt is positioned so that the press cake (19) is scraped off the lower belt (14); allowed to separate from the belt; and fall by gravity back onto the lower belt prior to the next pinch point, said separation and fall by gravity allowing the material to re-arrange and repack prior to passing through the next pinch point. Referring to FIG. 3B, the magnitude of the angle θ between a vertical line passing through the center of the lower-belt pinch point roller (20) and the center of the companion backward return roller (21) that forms the wavelike or S-shaped path for the lower belt is typically 15° to 75°. The direction of angle θ is clockwise beginning at the vertical centerline of the lower belt pinch point roller and ending at the center of the companion backward return roller that forms the wavelike or S-shaped path.

In a further preferred embodiment, brushes (27) wipe the underside surface of the lower belt after each backward return roller (21) and before material scraped off the lower belt falls by gravity onto said lower belt; wherein said brushes break the surface tension between liquid and the belt allowing liquid to separate from the fabric, providing for a drier fabric to adsorb additional liquid from the press cake material that falls by gravity back onto the lower belt. Liquid that is brushed and separated from the lower belt falls by gravity into a liquid collection trough (28) which may be an extension of the liquid collection trough for the gravity screening zone and wedge zone (29), or alternatively, a separate, independent liquid collection trough. An additional brush (30) wipes the underside surface of the lower belt on the continuous return loop back to the gravity screening zone and wedge zone.

In a further preferred embodiment, the gap width at each pinch point (25) between the upper roller (24) and the lower-belt pinch point roller (20) is adjusted by a mechanical separator device such as a screw type separator at the axial bearing rod of each upper roller and its respective lower-belt roller, making it possible to independently increase or decrease the gap width at each pinch point.

In a further preferred embodiment, each pinch point gap width separator may incorporate a spring compression or hydraulic cylinder compression assembly so that an increase in the flow of press cake through the gap will increase the compression pressure in the pinch point.

Figure 4:
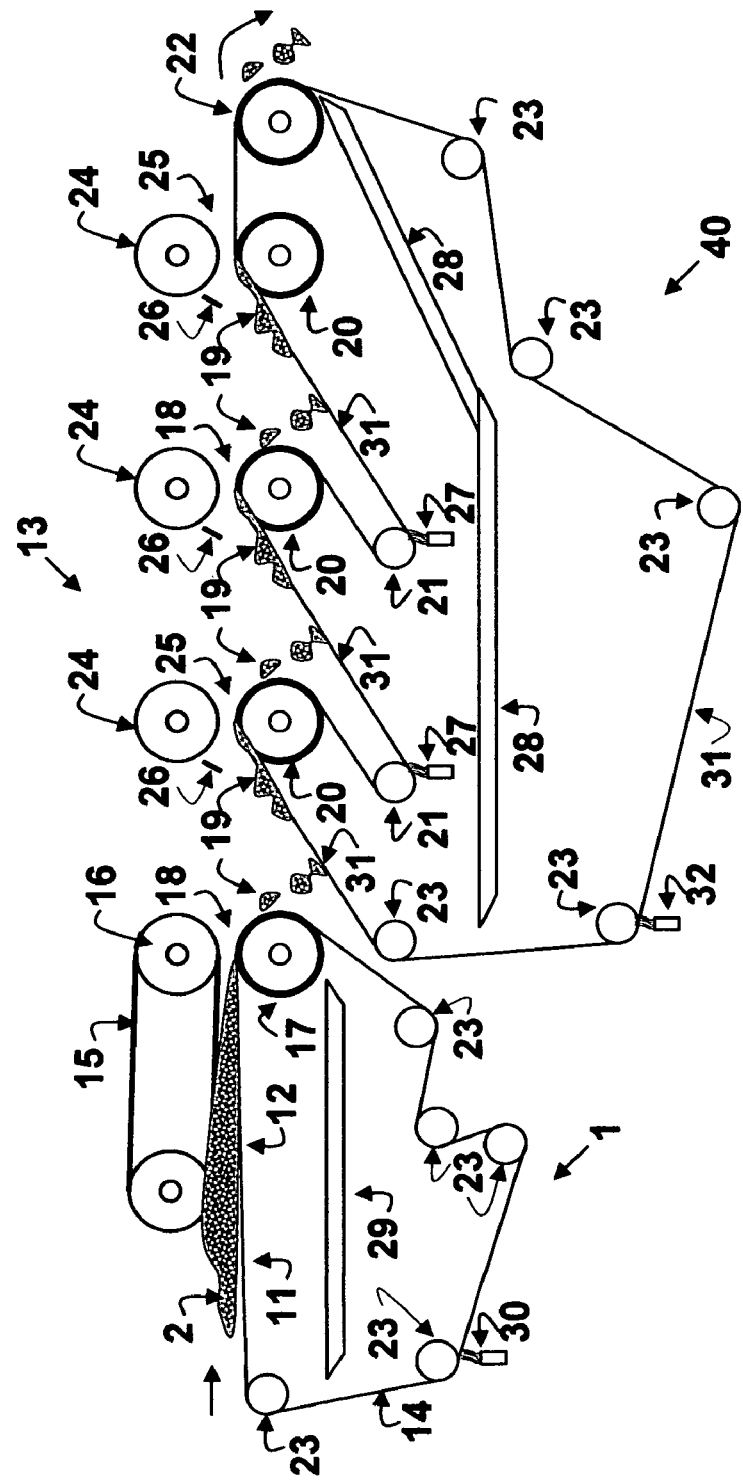
FIG. 4 is a cross-sectional view of a second embodiment of the invention wherein the high compression zone of the invention is added to an existing belt press based on prior art.

Referring to FIG. 4, a second embodiment of the invention is shown wherein an existing belt press based on prior art (1) that includes two sections—a gravity screening zone (11) and a wedge zone (12)—is enhanced with a belt press (40) that contains an independent high compression zone (13) that uses the method which is the subject of this invention. The lower belt (14) in the belt press based on prior art (1) is used only in the gravity screening zone and wedge zone. The independent high compression zone may have a lower permeable belt (31) that is different in material, fabric weave pattern, warp and weft thread diameters, opening size, and/or percent of open area than the lower permeable belt (14) in the gravity screening zone and wedge zone. A brush (30) wipes the underside surface of the lower belt (14) on the continuous return loop back to the gravity screening zone and wedge zone. Another brush (32) wipes the underside surface of the lower belt (31) on the continuous return loop back to the high compression zone.

In another embodiment of the invention, an existing belt press based on prior art that includes three sections—a gravity screening zone, a wedge zone, and a high compression zone designed with of a series of press rolls with solid/liquid mixture sandwiched between the upper and lower belt, wherein the upper and lower belt follow a path between progressively smaller press rolls which may be either perforated drums or solid press rolls—is enhanced with an independent belt press that contains a high compression zone that uses the method which is the subject of this invention.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A method of deliquifying comprising the steps of:

introducing a mixture of solids and liquids into a wedge zone defined by an upper belt and a lower permeable belt which converge with one another and together apply progressively increasing pressure as the mixture passes through said wedge zone and is compressed between the belts, thereby forming a deliquified cake which exits said wedge zone;

allowing the deliquified cake exiting the wedge zone to drop a distance onto said lower permeable belt, said lower permeable belt being caused to move in a wave or S-shaped path by a series of backward return rollers and lower pinch point rollers which are elevationally situated higher than said backward return rollers;

wiping the underside of said lower permeable belt after said lower permeable belt passes said backward return rollers to break the surface tension between any liquid and said lower permeable belt, thereby allowing liquid to separate from said lower permeable belt;

passing the deliquified cake through gaps of at least two pinch points along said wave or S-shaped path, said pinch points being defined by said lower pinch point rollers and at least two upper pinch point rollers to further deliquify said deliquified cake, wherein the centers of the backward return rollers in the wave or S-shaped path are positioned so that said deliquified cake is scraped off said lower permeable belt and allowed to separate from said lower permeable belt and fall by gravity back onto said lower permeable belt prior to the next pinch point, said separation and fall by gravity allowing the scraped off cake to re-arrange and repack prior to passing through the next pinch point; and discharging the deliquified cake that has passed though said at least two pinch points by passing said lower permeable belt over a discharge roller.

2. A method of deliquifying as set forth in claim 1, further comprising the step of independently increasing or decreasing the gap widths of said pinch points to vary the compression pressure of said pinch points.

3. A method of deliquifying as set forth in claim 2, wherein the step of independently increasing or decreasing the gap widths of said pinch points to vary the compression pressure of said pinch points is accomplished using a compression spring or hydraulic cylinder compression assembly.

4. A method of deliquifying as set forth in claim 1, further comprising the step of scraping any excess cake from said upper pinch point rollers using a scraper.

* * * * *